United States Patent [19]

Melis et al.

[11] Patent Number: 4,526,691
[45] Date of Patent: Jul. 2, 1985

[54] SEPARATOR APPARATUS

[76] Inventors: William Melis, 218 Doddridge, Corpus Christi, Tex. 78411; Richard D. Saam, 525 Louisiana Ave., Corpus Christi, Tex. 78404

[21] Appl. No.: 448,491

[22] Filed: Dec. 10, 1982

[51] Int. Cl.$^3$ .............................................. B01D 21/02
[52] U.S. Cl. .................................................... 210/521
[58] Field of Search ............... 210/801, 802, 521, 522, 210/541, 488, 489, 496

[56] References Cited

U.S. PATENT DOCUMENTS

| | | |
|---|---|---|
| 336,114 | 7/1888 | Donahue . |
| 1,190,863 | 7/1916 | Corne et al. . |
| 1,458,805 | 6/1923 | Christensen . |
| 1,732,386 | 10/1929 | Sprockhoff . |
| 1,864,911 | 6/1932 | Jodeck . |
| 1,946,414 | 2/1934 | Schmid ................................ 260/144 |
| 1,946,415 | 2/1934 | Schmid ................................ 260/144 |
| 2,014,431 | 9/1935 | Foster ....................................... 210/7 |
| 2,118,157 | 5/1938 | Camp ..................................... 210/55 |
| 2,207,399 | 7/1940 | Gaertner .............................. 210/43 |
| 2,369,194 | 2/1945 | Weber .................................. 210/55 |
| 2,673,451 | 3/1954 | Gariel ....................................... 61/2 |
| 2,868,384 | 7/1955 | Puddington ........................ 210/521 |
| 3,067,878 | 12/1962 | Genter .................................... 210/83 |
| 3,346,122 | 10/1967 | Cornelissen ........................ 210/522 |
| 3,450,264 | 6/1969 | Graybill .............................. 210/137 |
| 3,456,798 | 7/1969 | Urdanoff .............................. 210/73 |
| 3,491,892 | 1/1970 | McCann .............................. 210/521 |
| 3,552,554 | 1/1971 | Olgard ................................ 210/519 |
| 3,563,389 | 2/1971 | Mizraki ................................ 210/521 |
| 3,666,112 | 5/1972 | Pielkenroad ........................ 210/521 |
| 3,721,347 | 3/1973 | Pielkenroad ........................ 210/519 |
| 3,797,668 | 3/1974 | Pielkenroad ........................ 210/522 |
| 3,837,501 | 9/1974 | Pielkenroad ........................ 210/522 |
| 3,899,427 | 8/1975 | Connelly et al. ................... 210/521 |
| 3,914,175 | 10/1975 | Kunz et al. ......................... 210/802 |
| 3,925,205 | 12/1975 | Sparham .............................. 210/73 |
| 4,042,512 | 8/1977 | McCarthy .......................... 210/519 |
| 4,213,865 | 7/1980 | Wagner .............................. 210/522 |
| 4,337,561 | 7/1982 | James . |

FOREIGN PATENT DOCUMENTS

| | | |
|---|---|---|
| 1098155 | 7/1902 | France . |
| 1015977 | 10/1952 | France . |
| 907 | of 1886 | United Kingdom . |
| 17980 | of 1897 | United Kingdom . |
| 238007 | 8/1925 | United Kingdom . |

OTHER PUBLICATIONS

Clarification, Sedimentation, and Thickening Equipment-A Patent Review, by Barham, Matherne and Keller at p. 60, 1956.

Primary Examiner—Thomas Wyse
Attorney, Agent, or Firm—Arnold, White & Durkee

[57] ABSTRACT

There is disclosed an apparatus and method for conjuncting and separating density differentiated components from a moving carrier liquid. The liquid to be treated flows through zigzagging separation passages comprising cells extending through a three-dimensional lattice constructed of interconnected triangle pairs each defining a cell therebetween. The shear of the liquid is increased to induce component particle conjunctions by flowing the liquid through a narrow cell passage opening. The shear is then decreased as the liquid flows through the ever-widening cell to a wide cell passage opening to induce separation of the component particles. Heavy and light separated component particles are channeled to a lower side and upper side, respectively, of the lattice along zigzagging channels.

15 Claims, 13 Drawing Figures

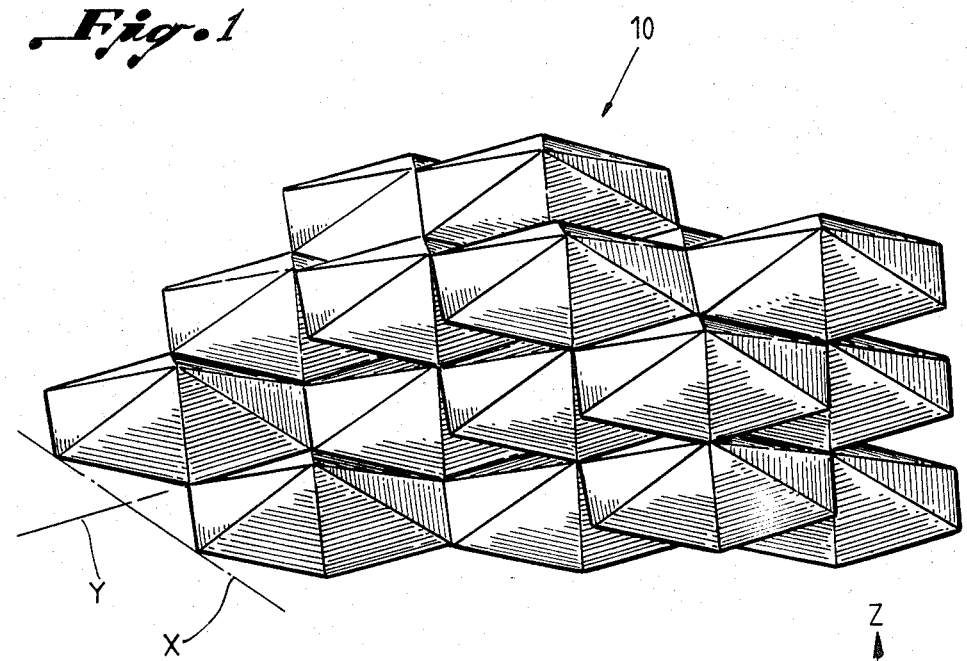
Fig. 1
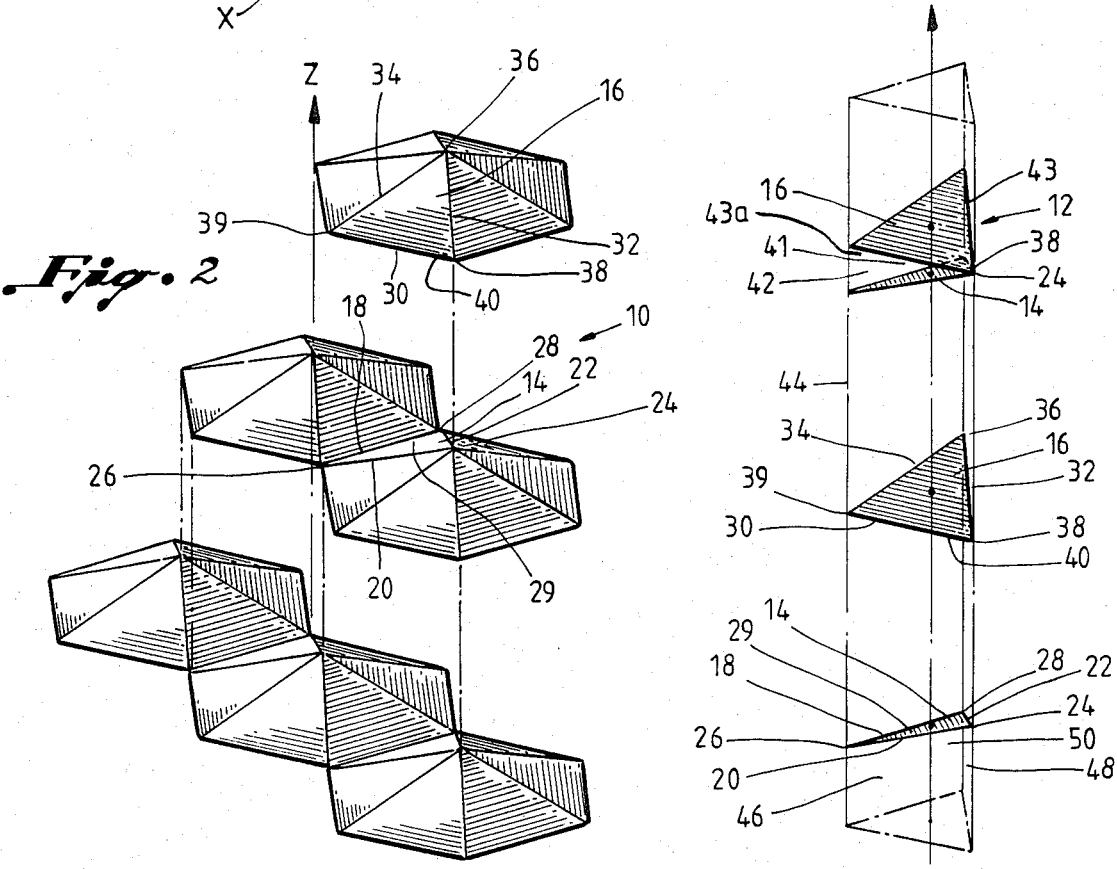
Fig. 2
Fig. 3

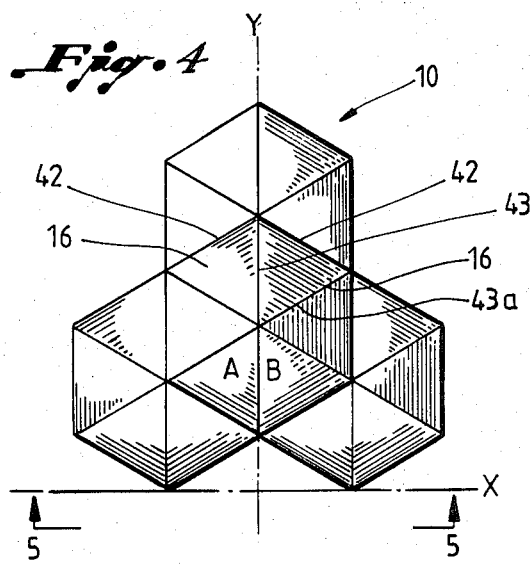
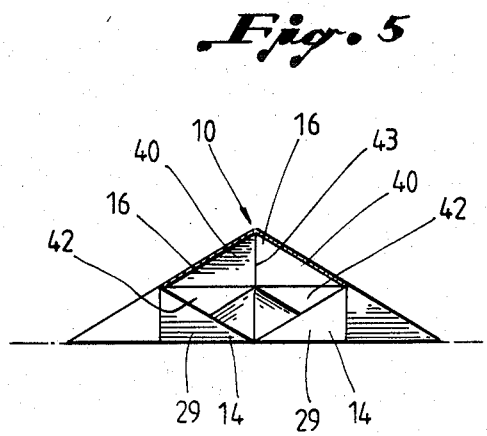
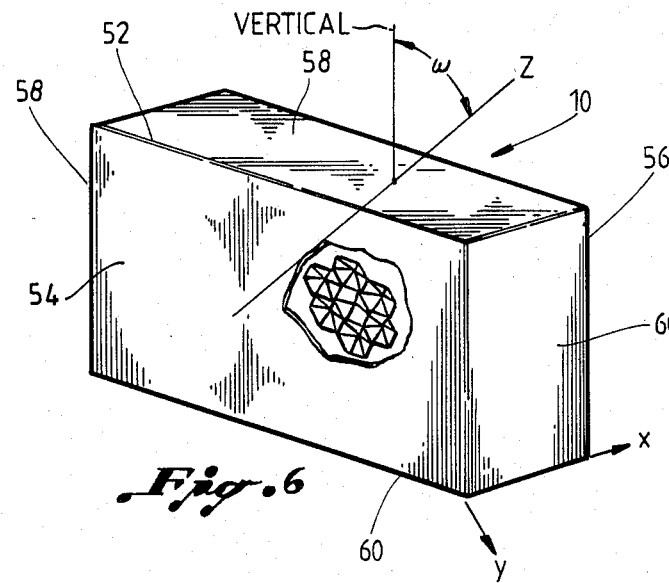
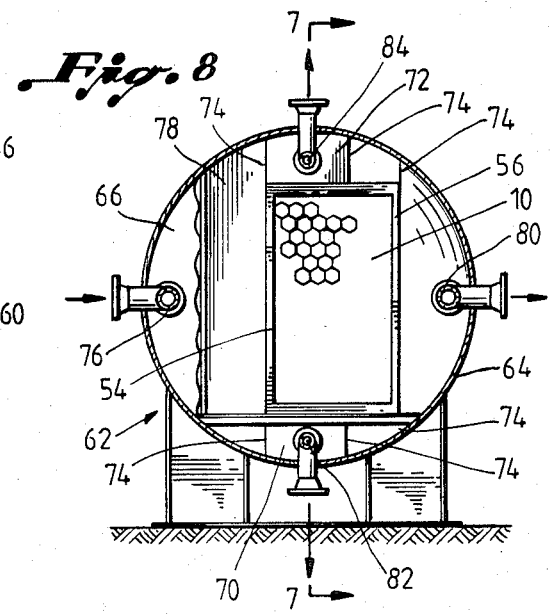
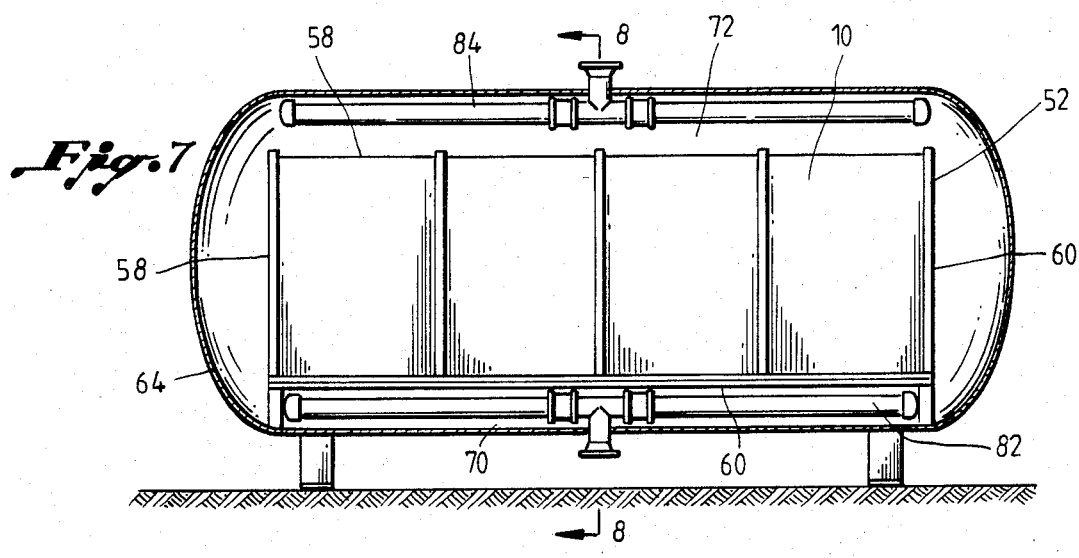

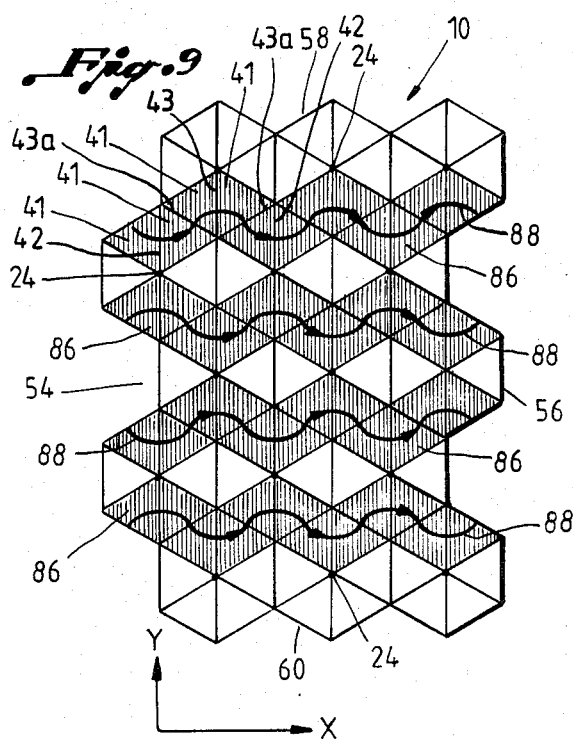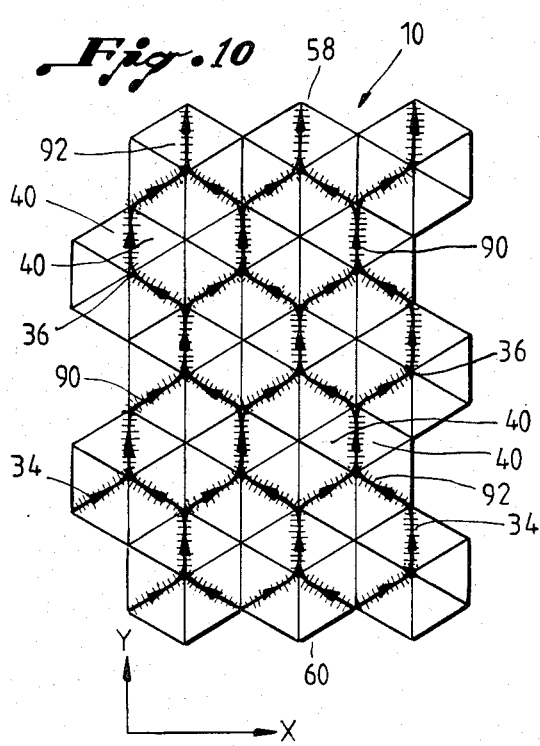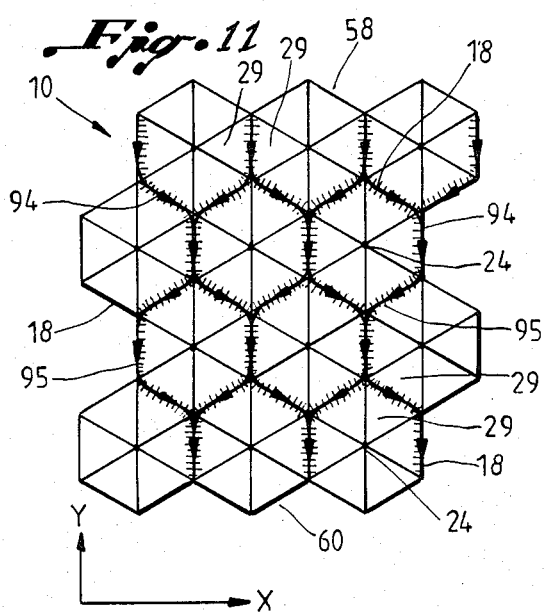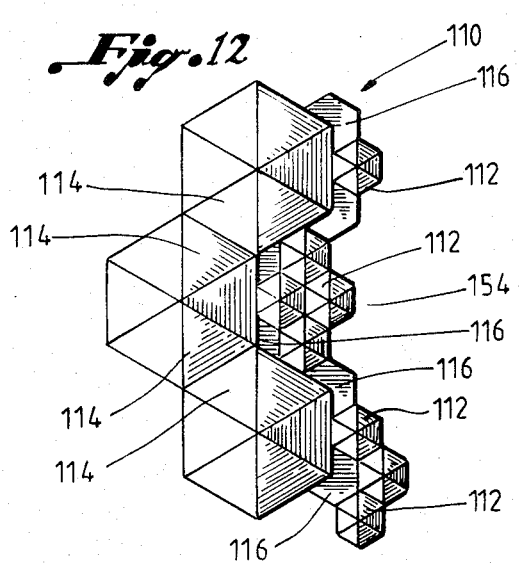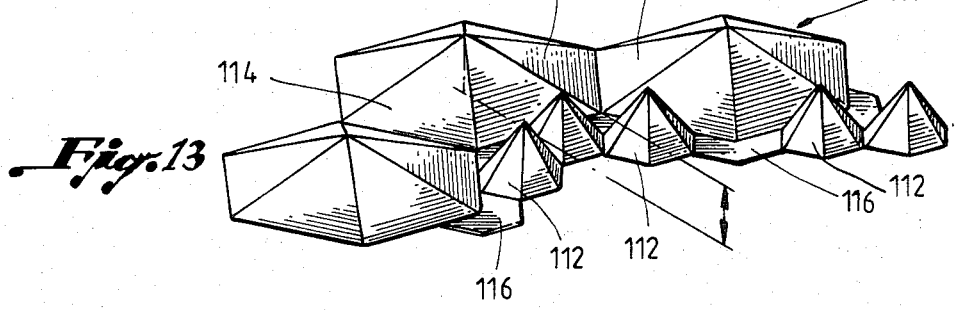

SEPARATOR APPARATUS

BACKGROUND OF THE INVENTION

1. Field of the Invention

This invention relates generally to apparatus and method for conjuncting and separating density differentiated components from a moving carrier liquid. More particularly, this invention concerns method and apparatus for use in a conventional flow-through separating tank.

2. Description of the Prior Art

Various devices are known for purifying liquids by mechanically separating undesirable components having densities different from that of the desired carrier liquid. This purification process involves both conjuncting and separating particles of the undesirable components. The conjunction operation includes coalescing and flocculating undesirable component particles to achieve particle sizes that are then susceptible to separation by settling or rising out of the carrier liquid as governed by Stokes' law.

Devices that perform the discrete conjuncting and separating functions are known. Conventional conjuncting devices include motorized paddles, impellers that agitate the carrier liquid, or stationary baffles and pipes through which the carrier liquid flows. By increasing the shear, i.e., changing the velocity with respect to distance, in the liquid to be treated, these devices cause suspended components to collide because of their differential velocities, leading to coalescence and flocculation of the component particles.

Clarifiers and parallel plate devices are examples of known separating apparatus. These devices utilize an increased effective settling or rising area and the principle of overflow rate to remove carrier liquid components having a settling or rising velocity parallel to the gravity force vector.

Early parallel plate devices included a stack of substantially parallel plates defining passages therebetween through which the liquid to be treated was flowed. As shown by U.S. Pat. No. 1,458,805 to Christensen, the stacked plates would be sloped and the liquid to be treated would be introduced from the upper or lower side of the plates. Heavy solids would thus flow downward along the plate surfaces, while the clear, lighter liquid would float upward.

Various modifications to the basic parallel plate concept have subsequently been made. For example, the use of corrugated plates, instead of smooth plates, has been suggested. U.S. Pat. No. 3,346,122 to Cornelissen discloses the use of corrugated plates. It has also been suggested that the flow of the carrier liquid should be transverse to rather than in line with the plates, as shown by U.S. Pat. No. 1,732,386 to Sprockhoff. Further examples of such devices are shown in U.S. Pat. No. 1,946,414 to Schmid, U.S. Pat. No. 386,114 to Donahue, and U.S. Pat. No. 3,837,501 to Pielkenrood. In all of the foregoing configurations, the inclination of the parallel plates directs the separated components to the boundaries of the plate pack for recovery.

All known systems for separating components from a carrier liquid are designed based on differential settling velocities of the discrete component particles. These settling velocities are determined by density differences between the component particles and the carrier liquid, carrier liquid viscosity, and particle diameter. Consideration of these factors results in a design which utilizes parallel plates to develop a uniform carrier liquid velocity distribution with minimum shear.

The components to be separated have a normal distribution of particle sizes and densities about some mean value. Conventional parallel plate systems separate each particle individually, independent of all other particles. This results in non-uniform performance of these parallel plate systems because of the various densities and sizes of the particles to be separated.

In addition to the disadvantage of non-uniform operation, conventional parallel plate devices are inadequate to conjunct component particles for subsequent settling or rising separation from the carrier liquid. Thus, a separate conjuncting device or chemical treatment is required to produce adequate particle size.

SUMMARY OF THE INVENTION

According to the present invention, apparatus and method for conjuncting and separating undesirable component particles from a carrier liquid in a single operation are provided whereby a more uniform separation of the component particles from the carrier liquid is achieved.

In one embodiment, an apparatus in accordance with the present invention comprises a three-dimensional lattice mountable in a separator for separating components from a carrier liquid. The lattice comprises a plurality of interconnected surface element pairs, each surface element pair comprising first and second mutually nonparallel surface elements. A cell is defined between the first and second surface elements through which the carrier liquid flows.

In another embodiment, an apparatus according to the present invention comprises a three-dimensional lattice having a horizontal x dimension and y and z dimensions mountable in a separating tank for separating components from a carrier liquid. The lattice is constructed of a plurality of interconnected surface element pairs each of which comprises first and second mutually nonparallel surface elements. The first and second surface elements touch at one point on their respective perimeters to define a cell therebetween. Each cell widens from a narrow cell passage opening to a wide cell passage opening. The surface element pairs are joined in the x, y and z directions to form the three-dimensional lattice, thereby joining adjacent cells in the x and y directions to form zig-zagging flow passages through lattice. These flow passages are interconnected in the x and y directions and are discrete from each other in the z direction.

In another embodiment, a three-dimensional lattice in accordance with the invention comprises a plurality of interconnected triangle pairs, each pair defining a cell therebetween. Each triangle pair comprises first and second triangles, each triangle being defined by a first side extending from the vertex to a first base angle, a second side extending from the vertex to a second base angle, a base, and an inwardly directed face. The second triangle is positioned above the first triangle so that the first base angle of the second triangle touches the vertex of the first triangle, the first base angle of the first triangle is located a distance X from the second base angle of the second triangle, and the second base angle of the first triangle is located a distance 2X from the vertex of the second triangle. Adjacent triangle pairs are joined in the x and y directions by joining the first sides, second sides, and bases of adjacent first and second triangles, respectively. The triangle pairs are also joined in the z direction so that the second triangle of a lower triangle pair is the first triangle of an upper adjacent triangle pair.

In a presently preferred embodiment, a three-dimensional lattice in accordance with the present invention is constructed of equal first and second isosceles triangles. The distance X between the first base angle of the first isosceles triangle and the second base angle of the second isosceles triangle is defined by the relationship $$X = \frac{Y \tan \theta°}{\sin \left(90 - \frac{\phi}{2}\right)°}$$

where
- Y = length of a line extending perpendicularly from the base to the vertex of the first or second isosceles triangle;
- $\phi$ = the vertex angle of the first or second isosceles triangle; and
- $\theta$ = the angle defined by the base of the second isosceles triangle and the first side of the first isosceles triangle.

In a further embodiment, the three-dimensional lattice has an inlet end, an opposite outlet end, an upper side and a lower side. The interconnected isosceles triangle pairs define a plurality of separation passages extending in the x direction from the inlet end to the outlet end of the lattice. A plurality of interconnected, zigzagging collection channels extending in the y direction to the lower side of the lattice are defined by the common bases and the inwardly directed faces of adjacent first isosceles triangles. The common second sides and the inwardly directed faces of adjacent second isosceles triangles define a plurality of interconnected, zigzagging collection troughs extending in the y direction to the upper side of the lattice. The lattice is inclined an angle $\omega$ between the z axis and the vertical by rotating the lattice about the horizontal x axis, $\omega$ being defined by the expression $$\theta° < \omega < 90°$$

In another embodiment of the invention, the isosceles triangle pairs adjacent the inlet end of the lattice are relatively small and increase in size toward the outlet end of the lattice.

In a further embodiment, the plurality of separation passages extend in the y direction from the upper side to the lower side of the lattice.

In a still further embodiment of a three-dimensional lattice according to the present invention, the isosceles triangle pairs adjacent either the upper side or the lower side of the lattice are relatively small, and the isosceles triangle pairs increase in size toward the lower side or upper side, respectively.

In a further embodiment of the present invention, the material of which the lattice is composed has a relatively strong affinity for the components to be separated from the carrier liquid.

In another embodiment of the present invention, a device for separating components from a carrier liquid comprises a tank having an inlet chamber for the liquid to be treated, an outlet chamber for the carrier liquid, and at least one collection chamber for receiving components which have been separated from the carrier liquid. A three-dimensional lattice as previously described is located in the tank and communicates with the inlet chamber, the outlet chamber and at least one collection chamber.

In a method according to the present invention for conjuncting and separating relatively lighter and heavier components from a carrier liquid by laminarly flowing the carrier liquid through a three-dimensional lattice of interconnected cells, the method comprises increasing the shear of the carrier liquid to increase the rate of component particle conjunctions by passing the carrier liquid through a narrow cell passage opening defined by the base of the second isosceles triangle and the first side of the first isosceles triangle. The rate of shear is then decreased to cause the conjuncted particles to settle or rise by flowing the carrier liquid through the cell toward a wide cell passage opening defined by the second side of the first isosceles triangle and the first side of the second isosceles triangle. The carrier liquid is then flowed through a downstream adjacent cell from its wide cell passage opening to its narrow passage opening to increase the shear of the fluid and the rate of component particle conjunctions. This process is repeated through subsequent downstream adjacent cells to alternately conjunct and separate the component particles until all particles have grown to a size that makes them susceptible to settling or rising within the lattice of interconnected cells.

In another embodiment of the method according to the present invention, the liquid to be treated first flows through relatively small cells in order to rapidly conjunct particles of the components to be separated. The liquid then flows through increasingly larger cells in order to promote separation of the conjuncted particles.

In a further embodiment of the method according to the present invention, the liquid to be treated flows through zigzagging separation passages in a substantially horizontal direction through the lattice from an inlet end to an outlet end. Heavy separated component particles are channeled along the y direction to a lower side of the lattice, the z axis being displaced from the vertical by an angle $\omega$ where $\theta° < \omega < 90°$. The heavy separated components follow a plurality of interconnected, zigzagging collection channels extending along the y direction to a lower side of the lattice, the channels being defined by the common bases and inwardly directed faces of adjacent first isosceles triangles. The light separated components are channeled along the y direction to an upper side of the lattice by following a plurality of interconnected, zigzagging collection troughs extending along the y direction to the upper side of the lattice. The troughs are defined by the common second sides and inwardly directed faces of adjacent second isosceles triangles.

In still another embodiment of the method according to the present invention, the liquid to be treated flows through zigzagging separation passages extending substantially along the y direction through the lattice from the upper side to the lower side of the lattice.

In still a further embodiment of the method, the liquid to be treated flows through zigzagging separation passages extending substantially along the y direction through the lattice from the lower side to the upper side.

It is therefore an advantage of the present invention that the operations of conjunction and separation are performed by a single three-dimensional lattice.

Another advantage of the invention is that because the separation passages, collection channels, and collection troughs zigzag through the lattice, adequate separation can be completed in a smaller space.

A further advantage of the invention is that separation of component particles is more uniform throughout the lattice because the separated component particles intermix as they flow toward the lattice boundary.

BRIEF DESCRIPTION OF THE DRAWINGS

In the accompanying drawings, wherein like reference numerals are used to designate like components:

FIG. 1 is a three-dimensional fragmented view of a lattice in accordance with the present invention.

FIG. 2 is an exploded, fragmented view of a lattice in accordance with the present invention.

FIG. 3 is an exploded and unexploded three-dimensional view of an isosceles triangle pair of the present invention.

FIG. 4 is a plan view of a portion of a lattice in accordance with the present invention showing the orientation of the x and y axes.

FIG. 5 is a view along line 5—5 of FIG. 4 with triangles A and B removed for clarity.

FIG. 6 is a three-dimensional view of a lattice in accordance with the present invention showing the orientation of the x, y and z axes.

FIG. 7 is a cross-section taken along line 7—7 of FIG. 8 showing a three-dimensional lattice in accordance with the present invention mounted in a conventional separator unit.

FIG. 8 is a longitudinal section along line 8—8 of FIG. 7.

FIG. 9 is a schematic representation of the flow pattern of a carrier liquid through a lattice in accordance with the present invention.

FIG. 10 is a schematic representation showing the flow pattern of the light separated component particles through the lattice of the present invention.

FIG. 11 is a schematic representation of the flow pattern of the heavy separated component particles through a lattice in accordance with the present invention.

FIG. 12 is a fragmented plan view of a lattice in accordance with the present invention having cells of variable sizes.

FIG. 13 is a three-dimensional fragmented view of a lattice in accordance with the present invention having cells of variable sizes.

DETAILED DESCRIPTION OF THE PREFERRED EMBODIMENTS

It will be appreciated that the present invention can take many forms and embodiments. Some embodiments of the invention are described to give an understanding of the invention. The embodiments described herein are intended to illustrate and not limit the invention.

Referring to FIGS. 1–5, there is shown in detail one embodiment of a three-dimensional lattice in accordance with the present invention having a horizontal x axis and y and z axes as shown. Three-dimensional lattice 10 is constructed of a network of interconnected isosceles triangle pairs 12. As shown in FIG. 3, each isosceles triangle pair 12 is composed of a first isosceles triangle 14 and a second isosceles triangle 16. First isosceles triangle 14 has a base 18, a first side 20, a second side 22, a vertex 24, a first base angle 26, a second base angle 28, and an inwardly directed face 29. Likewise, second isosceles triangle 16 has a base 30, a first side 32, a second side 34, a vertex 36, a first base angle 38, a second base angle 39 and an inwardly directed face 40. First isosceles triangle 14 and second isosceles triangle 16 define a cell 41 therebetween. Each cell has a narrow cell passage opening 42, and intermediate cell passage opening 43, and a wide cell passage opening 43a. The narrow and intermediate cell passage openings 42, 43 are both narrower than wide cell passage opening 43a.

Referring to FIG. 3, each isosceles triangle pair 12 is oriented as shown in an imaginary equilateral triangular prism 44 so that first side 20 of first isosceles triangle 14 and base 30 of second isosceles triangle 16 lie in one lateral face 46 of imaginary equilateral triangular prism 44; second side 22 of first isosceles triangle 14 and first side 32 of second isosceles triangle 16 lie in the plane of second lateral face 48 of imaginary equilateral triangular prism 44; and base 18 of first isosceles triangle 14 and second side 34 of second isosceles triangle 16 lie in the plane of third lateral face 50 of imaginary equilateral triangular prism 44.

First isosceles triangle 14 is positioned so that its vertex 24 touches first base angle 38 of second isosceles triangle 16. First base angle 26 of first isosceles triangle 14 is located a distance X from second base angle 39 of second isosceles triangle 16, and second base angle 28 of first isosceles triangle 14 is located a distance 2X from vertex 36 of second isosceles triangle 16. If Y is the height of each isosceles triangle 14 and 16 measured from the base to the vertex, $\phi$ is the value of the angle of vertex angles 24 and 36, and $\theta$ is the angle defined by base 30 of second isosceles triangle 16 and first side 20 of first isosceles triangle 14, X is defined by the relationship $$X = \frac{Y \tan \theta°}{\sin\left(90 - \frac{\phi}{2}\right)°}$$

As shown in FIGS. 1, 2, 4 and 5, isosceles triangle pairs 12 are joined in a network to form three-dimensional lattice 10. Adjacent triangle pairs 12 are joined in the x and y directions by joining bases 18, first sides 20 and second sides 22 of adjacent first isosceles triangles 14; and by joining bases 30, first sides 32, and second sides 34 of adjacent second isosceles triangles 16.

Isosceles triangle pairs 12 are also joined in the z direction. Thus, as shown by FIGS. 1 and 2, the second isosceles triangle 16 of a lower triangle pair is the first isosceles triangle of an upper isosceles triangle pair.

By extending this pattern of joining adjacent triangle pairs 12, a three-dimensional lattice 10 of any desired shape and size can be constructed.

Referring now to FIG. 6, there is shown a three-dimensional lattice 10 having a conventional rectangular prismoidal shape. Lattice 10 is mounted in a framework 52 which provides means for readily moving and handling the lattice. Preferably, lattice 10 has an inflow end 54 where the liquid to be treated enters the lattice, and an opposite outflow end 56 where the treated liquid exits the lattice. Light separated components exit lattice 10 at upper sides 58, while heavy components exit the lattice at lower sides 60. As shown, the x axis of lattice 10 is oriented horizontally and the z axis is rotated from the vertical an amount $\omega$. The angle $\omega$ is defined by $\theta° < \omega < 90°$ and is preferably about 45° for most efficent operation as is known to those skilled in the art. The angle ω must be greater than the angle θ so that light component particles are induced to flow toward upper sides 58 of lattice 10.

In an alternative construction, although not preferred, ends 54 and 56 are closed and the liquid to be treated is flowed through the lattice from upper sides 58 to lower sides 60, or from lower sides 60 to upper sides 58. As in the preferred lattice construction, light separated components exit the lattice at upper sides 58, and heavy components exit at lower sides 60.

Referring now to FIGS. 7 and 8, three-dimensional lattice 10 is shown mounted in a conventional separator 62. Separator 62 includes a separator tank 64 which is generally divided into an inlet chamber 66, an outlet chamber 68, a sludge collection chamber 70, and a chamber 72 for collecting light components. As shown, separator 62 is designed so that the liquid to be treated flows from inflow end 54 to opposite outflow end 56 of lattice 10. Bypass prevention baffles 74 induce the liquid to be treated to flow through lattice 10 and prevent mixing of the untreated and treated liquid with the separated light and heavy components.

Conventionally, separator 62 is equipped with a primary inlet flow distributor 76 and double slotted secondary distributor 78 to distribute the incoming liquid to be treated over inflow end 54 of lattice 10. Likewise, an outlet flow distributor 80, a sludge outlet distributor 82, and an outlet distributor 84 for light components are provided.

FIG. 9 depicts in plan view the separation passages 86 (shaded), formed by chains of connected cells 41, through which the liquid to be treated flows from inflow end 54 to opposite outflow end 56 following cross flow lines 88. Alternatively, although not preferred, the liquid to be treated may be flowed from upper side 58 to lower side 60 or from lower side 60 to upper side 58 (not shown).

Referring now to FIG. 10, there are shown in plan view looking up at inwardly directed faces 40 of second isoceles triangles 16 the flow lines 90 of separated light component particles. The light components follow troughs 92 (shaded) formed by the intersection along the second side 34 and the inwardly directed faces 40 of adjacent second isoceles triangles 16 to upper sides 58 of lattice 10.

FIG. 11 depicts in plan view the flow lines 94 of separated heavy component particles. These heavy components follow channels 95 (shaded) formed by the intersection along the bases 18 and inwardly directed faces 29 of adjacent first isoceles triangles 14 as they flow to lower side 60 of lattice 10.

In operation, three-dimensional lattice 10 functions in a separator 62 as follows. The liquid to be treated is introduced into separation passages 86 at inflow end 54. As the liquid passes through a narrow cell passage opening 42, the shear of the liquid is increased in order to increase the rate of component particle conjunctions. The component particles continue to increase in size as the liquid flows through a cell 41 toward a wide cell passage opening 43a. Because cell 41 increases in cross-sectional area toward wide cell passage opening 43a, the rate of shear of the liquid is decreased, inducing the large conjuncted particles to settle toward the first isoceles triangle 14 or to rise toward the second isoceles triangle 16. The liquid to be treated then flows through a downstream adjacent cell 41 from its wide cell passage opening 43a to its narrower intermediate cell passage opening 43, thereby again increasing the shear of the liquid and the rate of component particle conjunctions. The liquid then flows through the next downstream cell 41 from its intermediate cell passage opening 43 to its wider wide cell passage opening 43a to decrease the shear and then through the next cell to its narrow cell passage opening 42 to increase the shear. This process of alternately increasing and decreasing the shear of the liquid is repeated as the liquid flows through separation passages 86 from inflow end 54 to opposite outflow end 56 of lattice 10 until substantially all component particles are separated from the carrier liquid.

Flow lines 90 of the light component particles and flow lines 94 of the heavy component particles induce more uniform separation throughout lattice 10. As shown by FIGS. 10 and 11, flow lines 90 and 94 alternately converge and then diverge as they flow toward the lattice boundary. This induces a constant mixing of separated particles, which in turn creates a more uniform coating of separated materials on the lattice surfaces. Because those component particles that have already been separated out attract other suspended particles, separation of the component particles in lattice 10 of the present invention is more uniform than separation in conventional parallel plate devices.

Referring now to FIGS. 12 and 13, there is shown a modified version of the three-dimensional lattice of the present invention. Conjunction and separation of component particles may be more efficiently induced by first flowing the liquid to be treated through relatively small cells and subsequently increasing the cell size across the lattice. Such a configuration is more efficient because the smaller cells create larger shears in the liquid to more rapidly conjunct the component particles into larger sizes for separation. As the liquid flows through the lattice and these particles become larger, it is desirable to lessen the shear so that larger component particles are not broken up.

As shown in FIGS. 12 and 13, a modified lattice 110 has small cell-defining triangles 112 located adjacent an inflow end 154. Moving from this inflow end 154, the triangles are progressively enlarged into larger triangles 114. The flat transition surfaces 116 provide an interface between the graduated triangle sizes.

Preferably, lattices 10 and 110 are composed of a material which will attract the light component particles to induce their separation from the carrier. For example, if the light component is an oil, an oleofilic material such as polypropylene would be selected.

The foregoing description has been directed to particular embodiments of the invention in accordance with the requirements of the Patent Statute for the purpose of illustration and explanation. It will be apparent, however, to those skilled in this art that many modifications and changes in the apparatus and procedures set forth will be possible without departing from the scope and spirit of the invention. It is intended that the following claims be interpreted to embrace all such modifications and changes.

What is claimed is:

1. A three-dimensional lattice having a horizontal x dimension and y and z dimensions mountable in a separating tank for separating components from a carrier liquid, comprising:
   a. a plurality of interconnected triangle pairs, each pair defining a cell therebetween;
   b. each triangle pair comprising first and second triangles, the first and second triangles each being defined by a first side extending from the vertex to a first base angle, a second side extending from the vertex to a second base angle, a base and an inwardly directed face, the first and second triangles being positioned so that the first side of the first triangle and the base of the second triangle lie in the plane of a first lateral face of an imaginary triangular prism, the second side of the first triangle and the first side of the second triangle lie in a second lateral face of the imaginary triangular prism, and the base of the first triangle and the second side of the second triangle lie in a third lateral face of the imaginary triangular prism, the vertex of the first triangle touches the first base angle of the second triangle, the first base angle of the first triangle is located a distance X from the second base angle of the second triangle, and the second base angle of the first triangle is located a distance 2X from the vertex of the second triangle;

c. the triangle pairs being joined transversely in the x and y directions of the z-directioned longitudinal axis of the imaginary triangular prisms by joining (1) the first side of the first triangle of a triangle pair to the first side of the first triangle of a first adjacent triangle pair;

(2) the base of the second triangle of the triangle pair to the base of the second triangle of the first adjacent triangle pair;

(3) the second side of the first triangle of the triangle pair to the second side of the first triangle of a second adjacent triangle pair;

(4) the first side of the second triangle of the triangle pair to the first side of the second triangle of the second adjacent triangle pair;

(5) the base of the first triangle of the triangle pair to the base of the first triangle of a third adjacent triangle pair; and (6) the second side of the second triangle of the triangle pair to the second side of the second triangle of the third adjacent triangle pair; and d. the triangle pairs being joined in the z direction along the longitudinal axis of the imaginary triangular prisms so that the second triangle of a lower triangle pair is the first triangle of an upper adjacent triangle pair.

2. The three-dimensional lattice of claim 1, wherein:
a. the first and second triangles are equal isosceles triangles;
b. the imaginary triangular prism is an equilateral triangular prism; and
c. the distance X is defined by the relationship $$X = \frac{Y \tan \theta°}{\sin\left(90 - \frac{\phi}{2}\right)°}$$

where

Y = length of a line extending perpendicularly from the base to the vertex of the first or second isosceles triangle;

$\phi$ = the vertex angle of the first or second isosceles triangle; and $\theta$ = the angle defined by the base of the second isosceles triangle and the first side of the first isosceles triangle.

3. The three-dimensional lattice of claim 2, wherein:

a. the lattice has an inlet end, an opposite outlet end, an upper side and a lower side;

b. the interconnected isosceles triangle pairs define a plurality of separation passages extending in the x direction from the inlet end to the outlet end of the lattice, the separation passages comprising the interconnected cells defined by the isoscles triangle pairs;

c. the common bases and the inwardly directed faces of adjacent first isosceles triangles form a plurality of interconnected, zigzagging collection channels extending in the y direction to the lower side of the lattice;

d. the common second sides and the inwardly directed faces of adjacent second isosceles triangles form a plurality of interconnected, zigzagging collection troughs extending in the y direction to the upper side of the lattice; and e. the lattice is inclined an angle $\omega$ between the z axis and the vertical by rotating the lattice about the horizontal x axis, defined by $\theta° < \omega < 90°$.

4. The three-dimensional lattice of claim 3, wherein the isosceles triangle pairs adjacent the inlet end of the lattice are relatively small, the isosceles triangle pairs increase in size toward the outlet end of the lattice, and transition surfaces connect adjacent differentially sized triangle pairs.

5. The three-dimensional lattice of claim 2, wherein, a. the lattice has an upper side, a lower side, and opposed closed ends;

b. the interconnected isosceles triangle pairs define a plurality of separation passages extending in the y direction from the upper side to the lower side of the lattice, the separaton passages comprising the interconnected cells defined by the isosceles triangle pairs;

c. the common bases and the inwardly directed faces of adjacent first isosceles triangles form a plurality of interconnected, zigzagging collection channels extending in the y direction to the lower side of the lattice;

d. the common second sides and the inwardly directed faces of adjacent second isosceles triangles form a plurality of interconnected, zigzagging collection troughs extending in the y direction to the upper side of the lattice; and e. the lattice is inclined an angle $\omega$ between the z axis and the vertical by rotating the lattice about the horizontal x axis defined by $\theta° < \omega < 90°$.

6. The three-dimensional lattice of claim 5, wherein the isosceles triangle pairs adjacent either the upper side or lower side are relatively small, the isosceles triangle pairs increase in size toward the lower side or upper side, respectively, and transition surfaces connect adjacent differentially sized triangle pairs.

7. The three-dimensional lattice of claims 1, 2, 3, 4, 5 or 6 wherein the material of which the lattice is composed has a relatively strong affinity for the components to be separated from the carrier liquid.

8. A device for separating components from a carrier liquid, comprising:

a. a tank including an inlet chamber for the liquid to be treated, an outlet chamber for the treated carrier liquid, and at least one collection chamber for receiving components separated from the carrier liquid;

b. a three-dimensional lattice mounted in the tank and communicating with the inlet chamber, the outlet chamber and at least one collection chamber, the three-dimensional lattice comprising (1) a plurality of interconnected isosceles triangle pairs, each pair defining a cell therebetween;

(2) each isosceles triangle pair comprising equal first and second isosceles triangles, the first and second isosceles triangles each being defined by a first side extending from the vertex to a first base angle, a second side extending from the vertex to a second base angle, a base, and an inwardly directed face, the first and second isosceles triangles being positioned so that the first side of the first isosceles triangle and the base of the second isosceles triangle lie in the plane of a first lateral face of an imaginary equilateral triangular prism, the second side of the first isosceles triangle and the first side of the second isosceles triangle lie in a second lateral face of the imaginary triangular prism, and the base of the first isosceles triangle and the second side of the second isosceles triangle lie in a third lateral face of the imaginary equilateral triangular prism, the vertex of the first isosceles triangle touches the first base angle of the second isosceles triangle, the first base angle of the first isosceles triangle is located a distance X from the second base angle of the second isosceles triangle, and the second base angle of the first isosceles triangle is located a distance 2X from the vertex of the second isosceles triangle, X being defined by the relationship $$X = \frac{Y \tan \theta°}{\sin\left(90 - \frac{\phi}{2}\right)°}$$

where $Y$ = length of a line extending perpendicularly from the base to the vertex of the first or second isosceles triangle $\phi$ = the vertex angle of the first or second isosceles triangle; and $\theta$ = the angle defined by the base of the second isosceles triangle and the first side of the first isosceles triangle; and (3) the isosceles triangle pairs being joined transversely in the x and y directions of the z-directioned longitudinal axis of the imaginary equilateral triangular prisms by joining (a) the first side of the first isosceles triangle of an isosceles triangle pair to the first side of the first isosceles triangle of a first adjacent isosceles triangle pair;

(b) the base of the second isosceles triangle of the isosceles triangle pair to the base of the second isosceles triangle of first adjacent isoscles triangle pair;

(c) the second side of the first isosceles triangle of the isosceles triangle pair to the second side of the first isosceles triangle of a second adjacent isosceles triangle pair;

(d) the first side of the second isosceles triangle of the isosceles triangle pair to the first side of the second isosceles triangle of the second adjacent isosceles triangle pair;

(e) the base of the first isosceles triangle of the isosceles triangle pair to the base of the first isosceles triangle of a third adjacent isosceles triangle pair; and (f) the second side of the second isosceles triangle of the isosceles triangle pair to the second side of the second isosceles triangle of the third adjacent isosceles triangle pair;

(4) the triangle pairs being joined in the z direction along the longitudinal axis of the imaginary equilateral triangular prisms so that the second isosceles triangle of a lower isosceles triangle pair is the first isosceles triangle of an upper adjacent isosceles triangle pair; and (5) the lattice being inclined an angle $\omega$ between the z axis and the vertical by rotating the lattice about the horizontal x axis, defined by $\theta° < \omega < 90°$.

9. The device of claim 8, wherein a. the lattice has an inlet end communicating with the inlet chamber, an opposite outlet end communicating with the outlet chamber, an upper side in communication with a chamber for collecting light components, and a lower side communicating with a sludge collection chamber;

b. the interconnected isosceles triangle pairs define a plurality of zigzagging separation passages extending in the x direction from the inlet end to the outlet end of the lattice, the separation passages comprising the interconnected cells defined by the isosceles triangle pairs;

c. the common bases and the inwardly directed faces of adjacent first isosceles triangles form a plurality of interconnected, zigzagging collection channels extending in the y direction to the lower side of the lattice; and d. the common second sides and the inwardly directed faces of adjacent second isosceles triangles form a plurality of interconnected, zigzagging collection troughs extending in the y direction to the upper side of the lattice.

10. The device of claim 9, wherein the isosceles triangle pairs adjacent the inlet end of the lattice are relatively small, the isosceles triangle pairs increase in size toward the outlet end of the lattice, and transition surfaces connect adjacent differentially sized triangle pairs.

11. The device of claim 8, 9 or 10 wherein the material of which the lattice is composed has a relatively strong affinity for the components to be separated from the carrier liquid.

12. A three-dimensional lattice having a horizontal x dimension and y and z dimensions mountable in a separating tank for separating components from a carrier liquid, comprising:

a. a plurality of interconnected triangular surface element pairs;

b. each triangular surface element pair comprising first and second mutually nonparallel triangular surface elements, the sides of the first and second triangular surface elements lying in the lateral faces of an imaginary triangular prism having a z-directioned longitudinal axis, the first and second triangular surface elements being joined at a vertex of the first and second triangular surface elements, respectively;

c. the triangular surface element pairs being joined in the x and y directions by joining each side of the first triangular surface element to a like side of an adjacent first triangular surface element and by joining each side of the second triangular surface element to a like side of an adjacent second triangular surface element; and d. the triangular surface element pairs being joined in the z direction so that the second triangular surface element of a lower triangular surface element pair is the first triangular surface element of an upper adjacent triangular surface element pair.

13. A three-dimensional lattice mountable in a separator for separating components from a carrier liquid comprising:
   a. at least two layers of pyramids, each layer comprising a plurality of pyramids, each pyramid being hollow and having an open base;
   b. the plurality of pyramids in each layer being joined by joining the base edge of each lateral face of each centrally disposed pyramid in the layer to the base edge of a lateral face of an adjacent pyramid in the layer; and
   c. the layers of pyramids being joined by joining the vertex of each pyramid in a lower layer to an apex formed by two adjacent base edges of a pyramid in an adjacent upper layer, each lateral face of each pyramid of a lower layer being positioned directly opposite a lateral face of a pyramid in the adjacent upper layer.

14. A device for separating components from a carrier liquid comprising:
   a. a tank including an inlet chamber for the liquid to be treated, an outlet chamber for the treated carrier liquid, and at least one collection chamber for receiving components separated from the carrier liquid;
   b. a three-dimensional lattice having a horizontal x dimension and y and z dimensions mounted in the tank and communicating with the inlet chamber, the outlet chamber and at least one collection chamber, the three-dimensional lattice comprising:
      (1) a plurality of interconnected triangular surface element pairs;
      (2) each triangular surface element pair comprising first and second mutually nonparallel triangular surface elements, the sides of the first and second triangular surface elements lying in the lateral faces of an imaginary triangular prism having a z-directional longitudinal axis, the first and second triangular surface elements being joined at a vertex of the first and second triangular surface elements, respectively;
      (3) the triangular surface element pairs being joined in the x and y directions by joining each side of the first triangular surface element to a like side of an adjacent first triangular surface element and by joining each side of the second triangular surface element to a like side of an adjacent second triangular surface element; and
      (4) the triangular surface element pairs being joined in the z direction so that the second triangular surface element of a lower triangular surface element pair is the first triangular surface element of an upper adjacent triangular surface element pair.

15. A device for separating components from a carrier liquid comprising:
   a. a tank including an inlet chamber for the liquid to be treated, an outlet chamber for the treated carrier liquid, and at least one collection chamber for receiving components separated from the carrier liquid;
   b. a three-dimensional lattice mounted in the tank and communicating with the inlet chamber, the outlet chamber and at least one collection chamber, the three-dimensional lattice comprising:
      (1) at least two layers of pyramids, each layer comprising a plurality of pyramids, each pyramid being hollow and having an open base;
      (2) the plurality of pyramids in each layer being joined by joining the base edge of each lateral face of each centrally disposed pyramid in the layer to the base edge of a lateral face of an adjacent pyramid in the layer; and
      (3) the layers of pyramids being joined by joining the vertex of each pyramid in a lower layer to an apex formed by two adjacent base edges of a pyramid in an adjacent upper layer, each lateral face of each pyramid of a lower layer being positioned directly opposite a lateral face of a pyramid in the adjacent upper layer.

* * * * *